(12) United States Patent
Uchida

(10) Patent No.: US 7,152,854 B2
(45) Date of Patent: Dec. 26, 2006

(54) SPRING MECHANISM AND CELL CONTACT MECHANISM FOR SMALL ELECTRONIC DEVICE

(75) Inventor: Junichi Uchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/887,394

(22) Filed: Jul. 7, 2004

(65) Prior Publication Data

US 2005/0035512 A1 Feb. 17, 2005

(30) Foreign Application Priority Data

Jul. 11, 2003 (JP) .............................. 2003-195863

(51) Int. Cl.
*F16F 1/06* (2006.01)
*F16F 3/02* (2006.01)

(52) U.S. Cl. ...................... 267/178; 267/180; 439/500; 429/100; 429/121

(58) Field of Classification Search ................ 439/500; 267/88, 91, 166, 166.1, 178, 180; 429/96, 429/100, 121
See application file for complete search history.

(56) References Cited

U.S. PATENT DOCUMENTS

| | | | | |
|---|---|---|---|---|
| 2,397,469 A | * | 4/1946 | Casanov | 429/1 |
| 3,308,419 A | * | 3/1967 | Rohowetz et al. | 439/500 |
| 4,470,584 A | * | 9/1984 | Mizelle | 267/103 |
| 4,905,333 A | * | 3/1990 | Scott | 5/716 |
| 5,105,673 A | * | 4/1992 | Shibata | 74/97.1 |
| 5,219,030 A | * | 6/1993 | Mordick | 177/128 |
| 6,293,819 B1 | * | 9/2001 | Wu | 439/500 |
| 2003/0044676 A1 | * | 3/2003 | Chan | 429/121 |

FOREIGN PATENT DOCUMENTS

JP 6-313456 A 11/1994
JP 08-316651 * 11/1996

* cited by examiner

*Primary Examiner*—Devon Kramer
(74) *Attorney, Agent, or Firm*—Frishauf, Holtz, Goodman & Chick, P.C.

(57) ABSTRACT

In a cell cover according to the present invention, a compressed coil spring formed by deforming a linear elastic member is fixed to a plate member provided with a raised bent portion as a projection on a first side. The raised bent portion engages with an engagement part comprising a plurality of extended portions and bent portions of the compressed coil. A spring of the compressed coil is formed on a second side of the plate member. A spring seat winding at the bottom of the spring is pressed to the end face of the plate member.

17 Claims, 7 Drawing Sheets

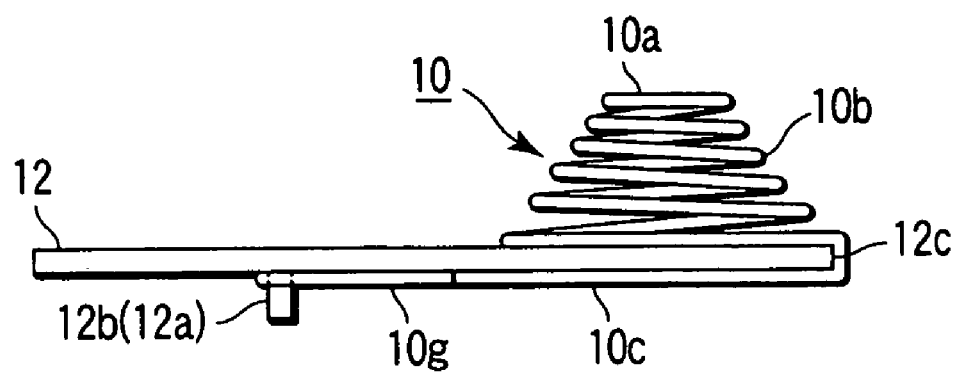
F I G. 1A
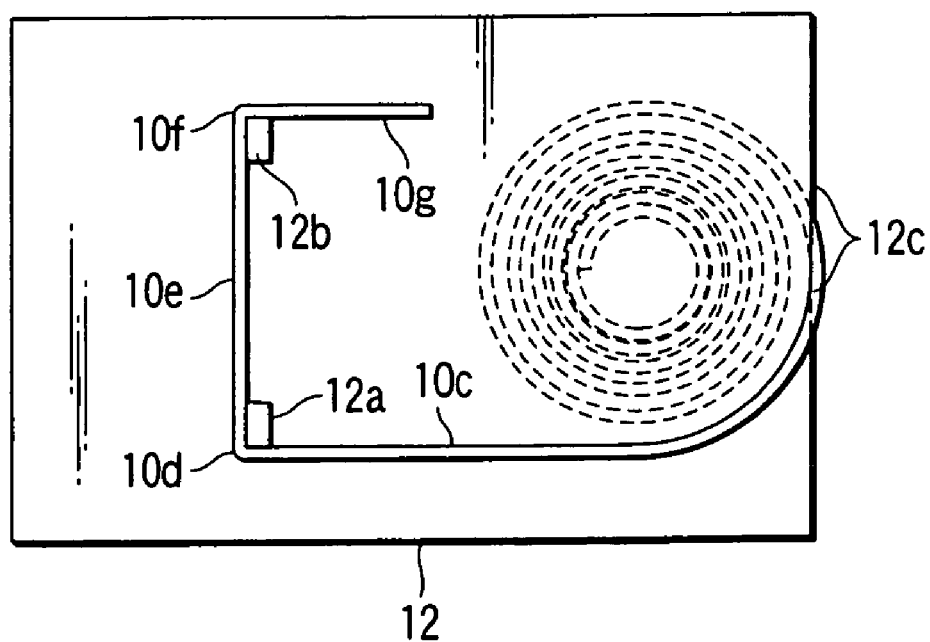
F I G. 1B

SPRING MECHANISM AND CELL CONTACT MECHANISM FOR SMALL ELECTRONIC DEVICE

CROSS-REFERENCE TO RELATED APPLICATIONS

This application is based upon and claims the benefit of priority from prior Japanese Patent Application No. 2003-195863, filed Jul. 11, 2003, the entire contents of which are incorporated herein by reference.

BACKGROUND OF THE INVENTION

1. Field of the Invention

The present invention relates to a spring mechanism for fixing a compressed coil spring to contact a dry cell, for example, and a cell contact mechanism for small electronic devices.

2. Description of the Related Art

Conventionally, in a cell housing of an electronic device, for example, a spring mechanism is used as a terminal plate to contact the cathode side of the cell. In the spring mechanism, a claw for fixing the compressed coil spring constituting the spring mechanism is formed at a predetermined position on the terminal plate in the cell housing.

The spring mechanism is formed as described in Jpn. Pat. Appln. KOKAI Publication No. 6-313456, for example. A pair of U-shaped tangential lines is cut in a process of punching a metallic cathode terminal member. The portion surrounded by the U-shaped tangential lines is raised. The raised portion is bent in a required direction to form a pair of bent fixing lugs in the terminal member. Then, a wire ring at the base end of a coil spring is brought into contact with the terminal member, so that both sides of the wire ring are opposed to the bent inside surfaces of the bent fixing lugs. The bent lugs are turned down toward both sides of the wire ring in this state, thereby fixing the coil spring to the terminal member.

However, in the art described in the Jpn. Pat. Appln. KOKAI Publication No. 6-313456, the coil spring is fixed to the terminal member in two steps. That is, the wire ring at the base end of the coil spring is brought into contact with the terminal member, so that both sides of the wire ring are opposed to the bent inside surfaces of the bent fixing lugs, and the bent lugs are turned down, or bent toward both sides of the wire ring, as a post-step in the coil spring fixing process.

Further, in the art of the Jpn. Pat. Appln. KOKAI Publication No. 6-313456, since the bent fixing lugs are fixed by bending toward both sides of the wire ring, once the coil spring is fixed, the coil spring cannot be removed without bending back the bent lugs to the original position.

BRIEF SUMMARY OF THE INVENTION

According to a first aspect of the present invention, there is provided a spring mechanism comprising a plate member which has a first side and a second side opposite to the first side, the first side having at least one projection, and a spring member which is formed by deforming a linear elastic member, wherein the spring member has an engagement part which engages with the projection, a joint which joins the end face of the plate member, and a compressed coil spring which is configured on the second side of the plate member.

According to a second aspect of the present invention, there is provided a cell contact mechanism for a small electronic device comprising:

plate member which is fixed to a casing member, and has a first side and a second side opposite to the first side, the first side having at least one projection; and spring member which is formed by deforming a linear elastic member with conductivity, and a part of which constitutes a cell contact, wherein both ends of the spring member form a compressed coil spring as a cell contact on the second side of the plate member, and the other part of the spring member which does not constitute the cell contact is arranged on the first side of the plate member and has an engagement part to engage with the projection; and the intermediate part of the spring member from the cell contact to the other part contacts the end face of the plate member, and fixes the spring member to the plate member by acting with engagement with the projection by the engagement part.

According to a third aspect of the present invention, there is provided a spring mechanism comprising a first member which has a first side and a second side opposite to the first side, and a second member which has a spring, wherein the first member has a first engagement part to engage with the second member; and the second member has a second engagement part to engage with the first member from the first side of the first member, a spring to contact the first member from the second side of the first member, and a joint to contact the end face of the first member.

According to a fourth aspect of the present invention, there is provided a spring mechanism comprising a first member which has a first side and a second side opposite to the first side, and a second member which has a spring, wherein the first member has a first engagement part to engage with the second member; and the second member has a second engagement part to engage with the first member, and a joint to contact the end face of the first member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIGS. 1A and 1B show the structure of a spring mechanism according to a first embodiment of the present invention;

FIG. 1A is a side view, and FIG. 1B is a plan view from the rear side of the plate member of FIG. 1A;

FIG. 2A is a side view, FIG. 2B is an outside perspective, and FIG. 2C is a plan view from the rear side of the plate member of FIGS. 2A and 2B;

FIG. 3A is a side view, and FIG. 3B is a plan view from the rear side of the plate member of FIG. 3A;

FIG. 4A is an outside perspective, FIG. 4B is a side view, and FIG. 4C is an elevation showing the structure of a compressed coil spring;

FIG. 5A is a plan view from the front side of the plate member, and FIG. 5B is a side view of FIG. 5A;

FIG. 6A is a perspective showing the front side, FIG. 6B is a view showing the front side, FIG. 6C is a view showing the rear side, and FIG. 6D is a magnified view of a cell cover.

Figure 2A:
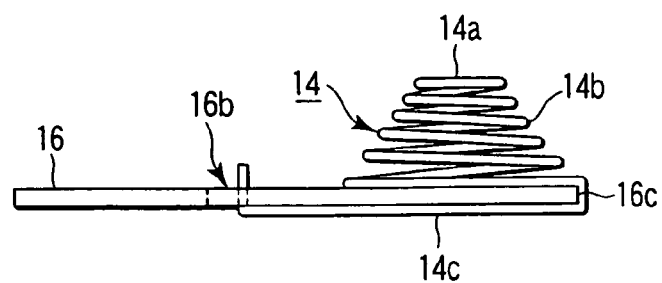
FIGS. 2A to 2C show the structure of a spring mechanism, which is a modification of the first embodiment.

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Hereinafter embodiments of the present invention will be explained with reference to the accompanying drawings.

(Embodiment 1)

FIGS. 1A and 1B show the structure of a spring mechanism according to a first embodiment of the present invention. FIG. 1A is a side view, and FIG. 1B is a plan viewed from the rear side of the plate member of FIG. 1A.

In FIGS. 1A and 1B, a compressed coil spring 10 is a spring member formed by deforming a linear elastic member. The compressed coil spring 10 constitutes a negative pole contact of a dry cell (not shown), and has a spring 10b that is a spiral portion continued from a contact 10a, or one end of the spring. The bottom of the spring 10b has a spring seat winding (an end turn of the coil spring 10) consisting of double-wound springs.

At the bottom of the spring 10b, an extension 10c is formed extended linearly from the bottom. The extension 10c is further extended and formed continuously with a bent portion 10d that is bent substantially perpendicularly to the other end of the compressed coil spring 10, a linear extended portion 10e, a bent portion 10f that is bent at almost right angle, and a linear extended portion 10g.

These continuously formed extended portion 10c, bent portion 10d, extended portion 10e, bent portion 10f and extended portion 10g constitute an engagement part for holding a plate member 12 together with the spring 10b of the compressed coil spring 10. In this case, the engagement part is substantially U-shaped.

In FIG. 1A, the lower side of the plate member 12 is considered a first side, and the upper side is considered a second side. The second side contacts the spring 10b of the compressed coil spring 10, and the first side contacts the engagement part of the compressed coil spring 10. The plate member 12 is held between the double-wound portions constituting the spring seat winding of the compressed coil spring 10, and thereby movement of the spring in the vertical direction is controlled.

In the state that the spring seat winding of the compressed coil spring 10 is pressed to the end face 12c, the plate member 12 forms raised bent portions 12a and 12b as projections at the positions adjacent to the bent portions 10d and 10f. These raised bent portions 12a and 12b serve as coming-off stoppers and left/right stoppers against the compressed coil spring 10 inserting direction.

The raised bent portions 12a and 12b are formed on the first side of the plate member 12. When the compressed coil spring 10 is fixed to the plate member 12 at the raised bent portions 12a and 12b, the engagement part of the compressed coil spring 10 must be deformed to ride over the raised bent portions 12a and 12b. The height from the first side of the plate member 12 is set to a value such that the deforming of the engagement part does not exceed the limit of the bending stress of the compressed coil spring 10.

In this structure, the plate member 12 is held between the double-wound portions constituting the spring seat winding of the compressed coil spring 10.

The compressed coil spring 10 is inserted in the direction where the raised bent portions 12a and 12b are formed, and in FIGS. 1A and 1B, the compressed coil spring 10 is inserted on the left side, until the internal circumference of the spring seat winding of the compressed coil spring 10 is pressed to the end face 12c of the plate member 12.

During this time, the bent portions 10d and 10f constituting the engagement part centering around the extended portion 10e are engaged and fixed so as to ride over and come into contact with the raised bent portions 12a and 12b.

As the spring mechanism is configured as above, the vertical movement of the compressed coil spring 10 is controlled by the spring seat winding. In FIG. 1B, the movement in the left and right directions is controlled by the end face 12c of the plate member 12 and the raised bent portions 12a and 12b. The movement in the up and down directions is controlled by the raised bent portions 12a and 12b. Therefore, the compressed coil spring 10 can be securely fixed to the plate member 12.

When removing the compressed coil spring 10 from the plate member 12, hold the extended portion 10e constituting the engagement part, and remove the bent portions 10d and 10f from the raised bent portions 12a and 12b. Then, move the compressed coil spring 10 from the engagement side to the joint side (in the direction opposite to insertion). The compressed coil spring will be easily removed from the plate member 12.

In the first embodiment, two raised bent portions are formed to meet the number of the bent portions, but it is permitted to form only one raised bent portion along the extended portion 10e.

Now explanation will be given on modifications of the first embodiment of the invention.

In the first embodiment, the compressed coil spring 10 is controlled by the end face 12c of the plate member 12 and the raised bent portions 12a and 12b. The control is not limited to this structure. The following modifications are also possible.

Figure 2B:
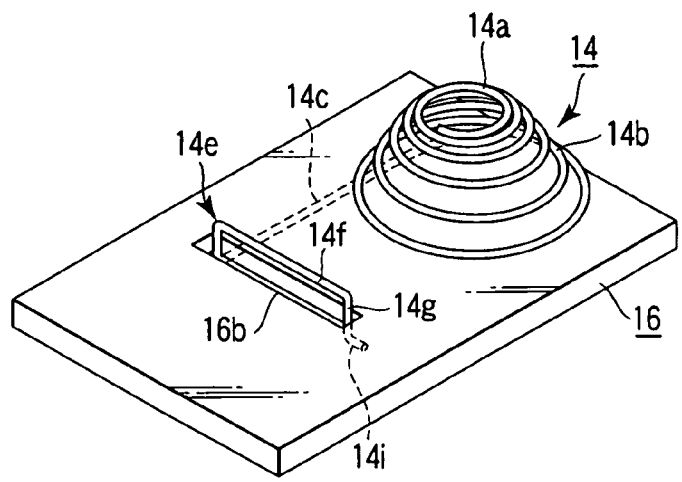
Figure 2C:
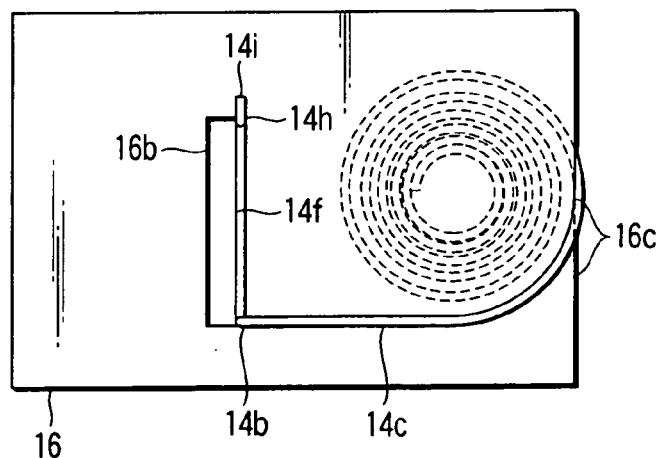

FIGS. 2A to 2C show the structure of a spring mechanism, which is a modification of the first embodiment. FIG. 2A is a side view, FIG. 2B is an outside perspective, and FIG. 2C is a plan viewed from the rear side of the plate member of FIGS. 2A and 2B.

In FIGS. 2A to 2C, the compressed coil spring 14 is a spring member formed by deforming a linear elastic member. As in the first embodiment, the compressed coil spring 14 has a spring 14b that is a spiral portion continued from a contact 14a, or one end of the spring. The bottom of the spring 14b has a spring seat winding in which a spring is doubly wound.

At the bottom of the spring 14b, an extension 14c is extended linearly from the bottom. The extension 14c is further extended and formed continuously with bent portions 14d and 14e that are bent substantially perpendicular to the other end of the compressed coil spring 14, a linear extended portion 14f, bent portions 14g and 14h that are bent at almost right angle, and a linear extended portion 14i.

The bent portion 14d is formed by bending the spring member extended from the extension 14c at almost right angle and extending upward in FIG. 2A. The extended spring member is further bent at almost right angle at the bent portion 14e and extended upward in FIG. 2C. This extended portion is the extended portion 14f.

The spring member is further extended from the extended portion 14f and bent downward at almost right angle at the bent portion 14g in FIG. 2A. The spring member bent at the bent portion 14g is further bent upward at the bent portion 14h, and formed as the extended portion 14i in FIG. 2C.

These continuously formed bent portions 14d and 14e, extended portion 14f, and bent portions 14g and 14h constitute an engagement part. In this case, the engagement part is substantially U-shaped. (Refer to FIG. 2C.)

In FIG. 2A, the lower side of the plate member 16 is considered a first side, and the upper side is considered a second side. The second side contacts the spring 14b of the compressed coil spring 14. The first side contacts the extended portions 14c and 14i of the compressed coil spring 14. At a predetermined position on the plate member 16, a substantially rectangular hole 16b is formed to insert the engagement part of the coil spring 14.

The plate member 16 is held between the double-wound portions constituting the spring seat winding of the compressed coil spring 14, thereby movement of the spring in the vertical direction is controlled. In the state that the spring seat winding of the compressed coil spring 14 is pressed to the end face 16c of the plate member 16, the engagement part of the compressed coil spring 14 is inserted and fit in the hole 16b.

By the engagement of the coil spring and hole 16b, the movement of the compressed coil spring in the up/down and left/right directions is controlled in FIG. 2C. The height of the vertical direction of the engagement composed of the bent portions 14d, 14e, extended portion 14f and bent portions 14g, 14h shall be larger than the thickness of the plate member 16, so that the engagement part projects to at least the second side of the plate member 16 in the state that the engagement part is inserted and fit in the hole 16b.

In this structure, the plate member 16 is held between the double-wound portions constituting the spring seat winding of the compressed coil spring 14. The engagement part of the compressed coil sprint 14 is inserted and fit in the hole 16b from the first side of the plate member 16.

As the spring mechanism is configured as above, the vertical movement of the compressed coil spring 14 is controlled by the spring seat winding. In FIG. 2C, the movement in the left and right directions is controlled by the end face 16c of the plate member 16 and the engagement of the compressed coil spring 14 and hole 16b. The movement in the up and down directions is controlled by the engagement of the compressed coil spring 14 and hole 16b. Therefore, the compressed coil spring 14 can be securely fixed to the plate member 16.

When removing the compressed coil spring 14 from the plate member 16, push the extended portion 14f constituting the engagement part from the second side of the plate member 16, and disengage the engagement part from the hole 16b. Then, move the compressed coil spring 14 from the engagement side to the joint side (in the direction opposite to insertion). The compressed coil spring will be easily removed from the plate member 16.

Modifications of the first embodiment are as described above. Modifications are not limited to them. For example, it is permitted to provide two or more holes, or to combine with the projections.

(Embodiment 2)

A second embodiment of the present invention will be explained.

Figure 3A:
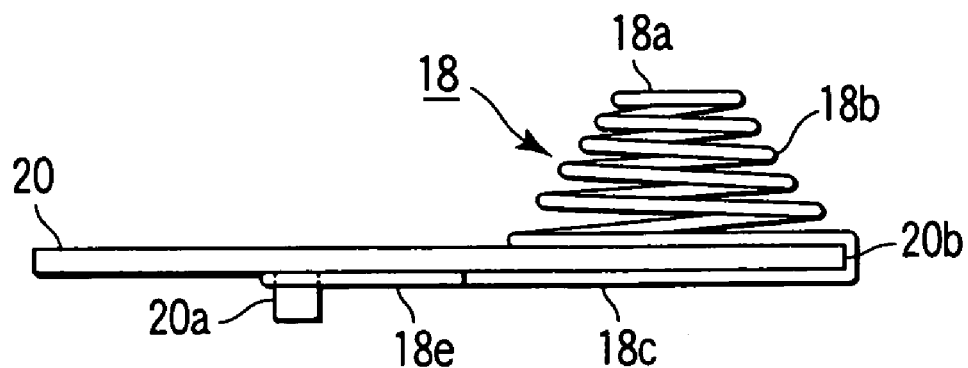
FIGS. 3A and 3B show the structure of a spring mechanism according to a second embodiment of the invention.
Figure 3B:
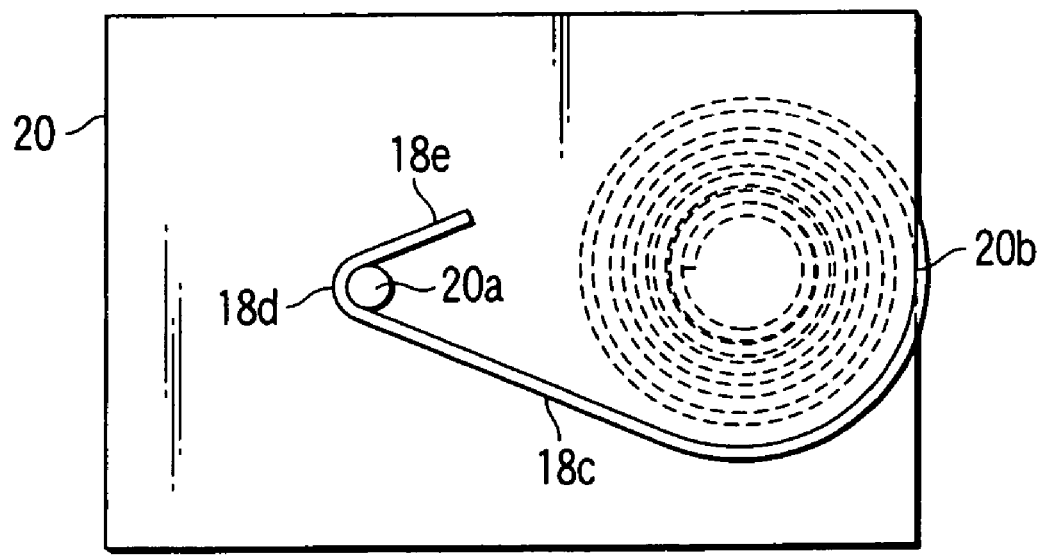

FIGS. 3A and 3B show the structure of a spring mechanism according to a second embodiment of the invention. FIG. 3A is a side view, and FIG. 3B is a plan viewed from the rear side of the plate member of FIG. 3A.

In FIGS. 3A and 3B, a compressed coil spring 18 is a spring member formed by deforming a linear elastic member. The coil spring constitutes a negative pole contact of a dry cell (not shown), and has a spring 18b that is a spiral portion continued from a contact 18a, or one end of the spring. The bottom of the spring 18b has a spring seat winding consisting of double-wound springs.

At the bottom of the spring 18b, an extension 18c is formed extended linearly from the bottom. The extension 18c is further extended and formed continuously with a bent portion 18d that is bent substantially perpendicular to the other end of the compressed coil spring 18, and a linear extended portion 18e.

These continuously formed extended portion 18c, bent portion 18d and extended portion 18e constitute an engagement part for holding a plate member 20 together with the spring 18b of the compressed coil spring 18. In this case, the engagement part is substantially V-shaped.

In FIG. 3A, the lower side of the plate member 20 is considered a first side, and the upper side is considered a second side. The second side contacts the spring 18b of the compressed coil spring 18, and the first side contacts the engagement part of the compressed coil spring 18. The plate member 20 is held between the double-wound portions constituting the spring seat winding of the compressed coil spring 18, thereby movement of the spring in the vertical direction is controlled.

In the state that the spring seat winding of the compressed coil spring 18 is pressed to the end face 20b, the plate member 20 forms raised bent portion 20a as a projection at the position adjacent to the bent portion 18d. The raised bent portion 20a serves as a coming-off stopper and a left/right stopper against the compressed coil spring 18 inserting direction.

The raised bent portion 20a is formed on the first side of the plate member 20. When the compressed coil spring 18 is fixed to the plate member 20, the engagement part of the compressed coil spring 18 needs to be deformed to ride over the raised bent portion 20a. The height of the raised bent portion 20a from the first side of the plate member 20 shall be set so that the deforming of the engagement part does not exceed the limit of the bending stress of the compressed coil spring 18.

In this structure, the plate member 20 is held between the double-wound portions constituting the spring seat winding of the compressed coil spring 18. The compressed coil spring 18 is inserted in the direction where the raised bent portion 20a is formed. The compressed coil spring 18 is inserted on the left side in FIGS. 3A and 3B, until the internal circumference of the spring seat winding of the compressed coil spring 18 is pressed to the end face 20b of the plate member 20.

In this time, the bent portion 18d constituting the engagement part is engaged and fixed so as to ride over and come in contact with the raised bent portion 20a.

As the spring mechanism is configured as above, the vertical movement of the compressed coil spring 18 is controlled by the spring seat winding. In FIG. 3B, the movement in the left and right directions is controlled by the end face 20b of the plate member 20 and the raised bent portion 20a. The movement in the up and down directions is controlled by the raised bent portion 20a. Therefore, the compressed coil spring 18 can be securely fixed to the plate member 20.

When removing the compressed coil spring 18 from the plate member 20, hold the extended portion 18d constituting the engagement part, and remove it from the raised bent portions 20a. Then, move the compressed coil spring 18 from the engagement side to the joint side (in the direction opposite to insertion). The compressed coil spring will be easily removed from the plate member 20.

(Embodiment 3)

A third embodiment of the present invention will be explained.

Figure 4A:
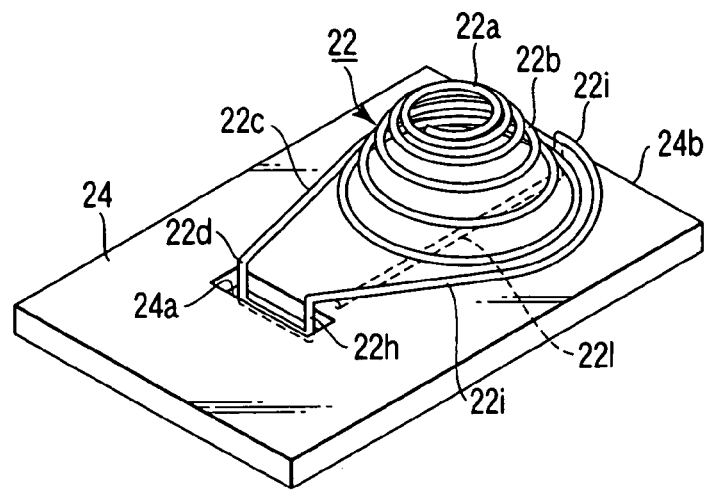
FIGS. 4A to 4C show the structure of a spring mechanism according to a third embodiment of the invention.
Figure 4B:
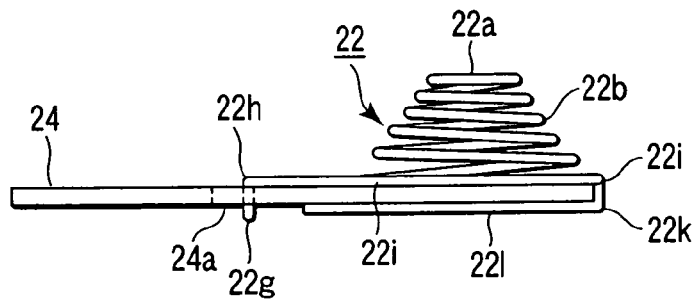
Figure 4C:
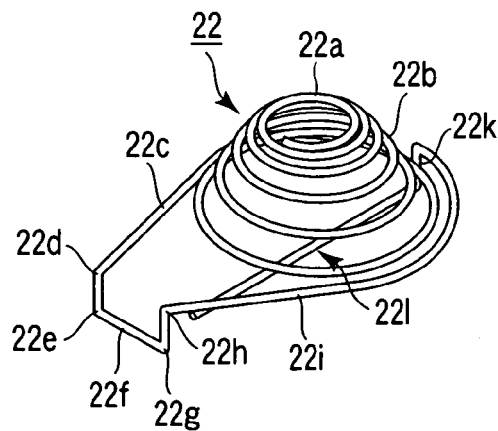

FIGS. 4A to 4C show the structure of a spring mechanism according to a third embodiment of the invention. FIG. 4A is an outside perspective, FIG. 4B is a side view, and FIG. 4C is an elevation showing the structure of a compressed coil spring.

In FIGS. 4A to 4C, a compressed coil spring 22 is a spring member formed by deforming a linear elastic member. In the third embodiment, the engagement part and spring of the compressed coil spring 22 are arranged on the same side of a plate member.

The compressed coil spring 22 has a spring 22b that is a spiral portion continued from a contact 22a, or one end of the spring. The bottom of the spring 22b has a spring seat winding consisting of a double-wound springs.

At the bottom of the spring 22b, an extension 22c is extended linearly from the bottom. The extension 22c is further extended and formed continuously with bent portions 22d and 22e that are bent substantially perpendicular to the other end of the compressed coil spring 22, a linear extended portion 22f, bent portions 22g and 22h that are bent at almost right angle, a linear extended portion 22i, bent portions 22j and 22k near the spring seat winding, and an extension 22l as a holder.

The bent portion 14d is formed by bending the spring member extended from the extension 14c at almost right angle and extending upward in FIG. 4B. The extended spring member is further bent at almost right angle at the bent portion 14e, and extended to the front side in FIG. 4B. This extended portion is the extended portion 22f.

The spring member is further extended from the extended portion 22f and bent upward at almost right angle at the bent portion 22g in FIG. 4B. The spring member bent at the bent portion 22g is bent rightward at the bent portion 22h in FIG. 4B, and formed as the extended portion 22i.

These continuously formed bent portions 22d and 22e, extended portion 22f, and bent portions 22g and 22h constitute a first engagement. In this case, the first engaged part is substantially U-shaped. (Refer to FIG. 4C.)

The spring member reached close to the spring seat winding through the extended portion 22i is bent downward at almost right angle at the bent portion 22j in FIG. 4B, at the furthest position from the first engagement part, for example. The spring member bent at the bent portion 22j is further bent at almost right angle at the bent portion 22k, and bent leftward in FIG. 4B, and formed as the extended portion 22l. These bent portions 22j and 22k constitute a second engagement part to engage with the plate member 24.

In FIG. 4B, the lower side of the plate member 24 is considered a first side, and the upper side is considered a second side. The second side contacts the spring 22b of the compressed coil spring 22 and the extended portions 22c and 22i. The first side contacts the extended portion 22l of the compressed coil spring 22. At a predetermined position on the plate member 24, a substantially rectangular hole 24a is formed to insert the first engagement part of the coil spring 22.

The plate member 24 is held between the spring seat winding and the extended portion 22l as a holder, contacting the second engagement part, thereby movement of the spring in the vertical direction is controlled. In the state that the second engagement part of the compressed coil spring 22 is pressed to the end face 24b of the plate member 24, the first engagement part of the compressed coil spring 22 is inserted and fit in the hole 24a.

By the engagement of the hole 24a and the first engagement part of the coil spring 22, the movement of the compressed coil spring 22 is controlled in the direction orthogonal to the vertical direction.

The height of the vertical direction of the first engagement composed of the bent portions 22d, 22e, extended portion 22f and bent portions 22g, 22h shall be larger than the thickness of the plate member 24, so that the engagement part projects to at least the first side of the plate member 24 in the state that the engagement part is inserted and fit in the hole 24a. The gap between the extended portion 22l and the spring seat winding of the compressed coil spring 22, or the width of the second engagement part in the vertical direction corresponds to the thickness of the plate member 24.

In this structure, the plate member 24 is held between the extended portion 22l and the spring seat winding of the compressed coil spring 22. The first engagement part of the compressed coil sprint 22 is inserted and fit in the hole 24a from the second side of the plate member 24.

Since the spring mechanism is configured as above, the vertical movement of the compressed coil spring 22 is controlled by the spring seat winding and the holder (extended portion 22l). The movement in the direction orthogonal to the vertical direction of the compressed coil spring 22 is controlled by the engagement of the end face 24bc of the plate member 24 and the second engagement part of the compressed coil spring 22, and the engagement of the hole 24a and the first engagement of the compressed coil spring 22. Therefore, the compressed coil spring 22 can be securely fixed to the plate member 24.

When removing the compressed coil spring 22 from the plate member 24, push the extended portion 22f from the first side of the plate member 24, and disengage the first engagement part from the hole 24a. Then, move the compressed coil spring 22 from the first engagement part to the second engagement part (in the direction opposite to insertion). The compressed coil spring will be easily removed from the plate member 24.

(Embodiment 4)

In the first to third embodiments, a negative pole contact for one dry cell is described. But, the number of dry cells is not limited to one. A contact for two or more dry cells is also permitted.

Figure 5A:
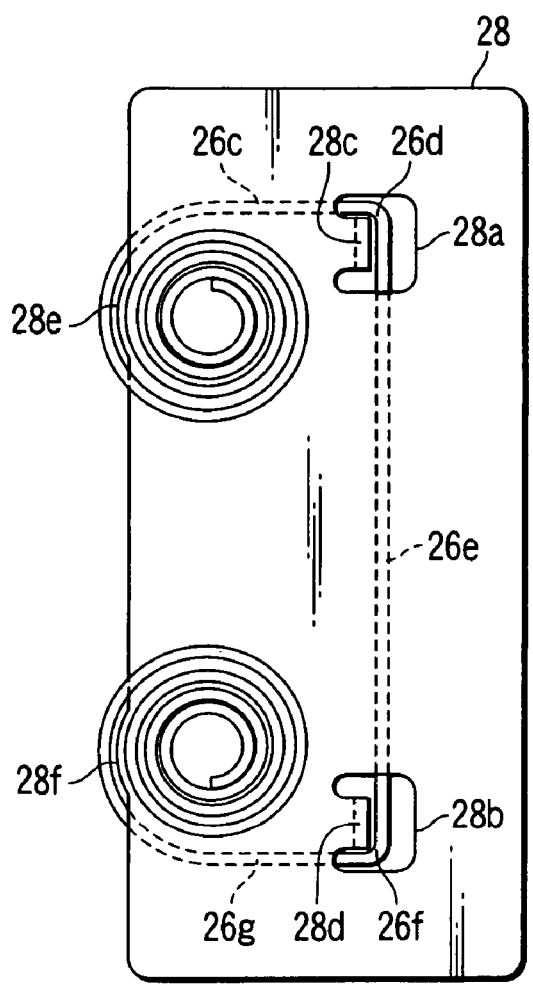
FIGS. 5A and 5B show the structure of a spring mechanism according to a fourth embodiment of the invention.
Figure 5B:
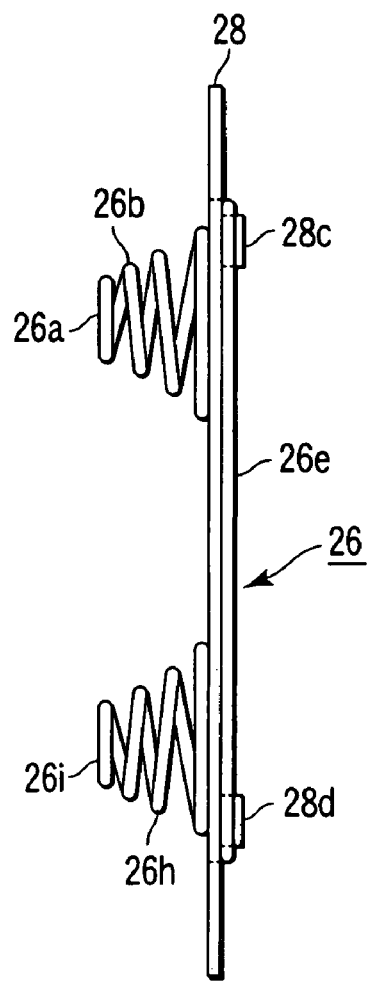

FIGS. 5A and 5B show the structure of a spring mechanism according to a fourth embodiment of the invention. FIG. 5A is a plan viewed from the front side of the plate member, and FIG. 5B is a side view of FIG. 5A.

In FIGS. 5A and 5B, a compressed coil spring 26 is a spring member formed by deforming a linear elastic member. The coil spring constitutes a contact of a dry cell (not shown), and has a first spring 26b that is a spiral portion continued from a contact 26a, or one end of the spring. The bottom of the first spring 26b has a spring seat winding consisting of double-wound springs.

At the bottom of the first spring 26b, an extension 26c is extended linearly from the bottom. The extension 26c is further extended and formed continuously with a bent portion 26d that is bent substantially perpendicular to the other end of the compressed coil spring 26, a linear extended portion 26e, a bent portion 26f bent at almost right angle, and a second spring 26h that is a spiral portion continued to a contact 26i, or the other end, through a linear extended portion 26g. The bottom of the second spring 26h has a spring seat winding consisting of double-wound springs, like the first spring 26b.

These continuously formed extended portion 26c, bent portion 26d, extended portion 26e, bent portion 26f, and extended portion 26g constitute an engagement part for holding a plate member 28 together with the first and second springs 26b and 26h of the compressed coil spring 26. In this case, the engagement part is substantially U-shaped.

In FIG. 5B, the right side of the plate member 28 is considered a first side, and the left side is considered a second side. The second side contacts the first and second springs 26b and 26h of the compressed coil spring 26, and the first side contacts the engagement part of the compressed coil spring 26. The plate member 28 is held between the double-wound portions constituting the spring seat winding of the compressed coil spring 26, thereby movement of the compressed coil spring 26 in the vertical direction is controlled.

In the state that two spring seat windings of the compressed coil spring 26 are pressed to the end faces 28e and 28f, the plate member 28 forms notches 28a and 28b near the bent portions 26d and 26f. In these notches 28a and 28b, raised bent portions 28c and 28d are formed as projections by being bent to the first side of the plate member 28, so as to engage with the bent portions 26d and 26f. These raised bent portions 28c and 28d serve as coming-off stoppers and left/right stoppers against the compressed coil spring 26 inserting direction.

When the compressed coil spring 26 is fixed to the plate member 28, the engagement part of the compressed coil spring 26 needs to be deformed to ride over the raised bent portions 28a and 28b. The height of the raised bent portions 28c and 28d from the first side of the plate member 28 shall be set so that the deforming of the engagement part does not exceed the limit of the bending stress of the compressed coil spring 26.

In this structure, the plate member 28 is held between the double-wound portions constituting the spring seat winding of the compressed coil spring 26. The compressed coil spring 26 is inserted in the direction where the raised bent portions 28c and 28d are formed. The compressed coil spring 26 is inserted on the left side in FIG. 5A, until the internal circumference of the two spring seat windings of the compressed coil spring 26 is pressed to the end faces 28e and 28f of the plate member 28.

In this time, the bent portions 26d and 26f constituting the engagement part centering around the extended portion 26e are engaged and fixed so as to ride over and come in contact with the raised bent portions 28c and 28d.

Since the spring mechanism is configured as above, the vertical movement of the compressed coil spring 26 is controlled by the spring seat winding. In FIG. 5A, the movement in the left and right directions is controlled by the end faces 28e and 28f of the plate member 28 and the raised bent portions 28c and 28d. The movement in the up and down directions is controlled by the raised bent portions 28c and 28d. Therefore, the compressed coil spring 26 can be securely fixed to the plate member 28.

When removing the compressed coil spring 26 from the plate member 28, hold the extended portion 26e constituting the engagement part, and disengage the bent portions 26d and 26f from the raised bent portions 28c and 28d. Then, move the compressed coil spring 26 from the engagement side to the joint side (in the direction opposite to insertion). The compressed coil spring will be easily removed from the plate member 28.

(Embodiment 5)

A fifth embodiment of the present invention will be explained.

In the fifth embodiment, the spring mechanism is used as a cell contact mechanism for a small electronic device.

Figure 6D:
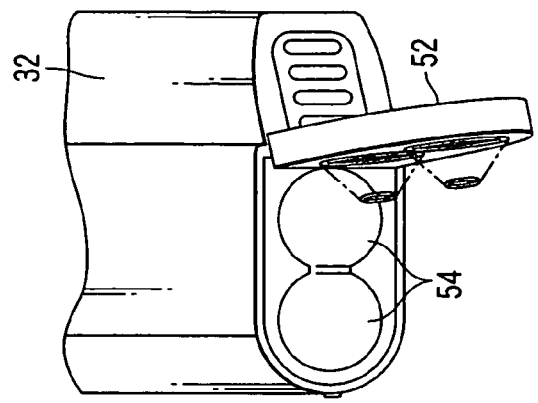
FIGS. 6A to 6D are external views showing the concrete structure of an audio recording-playback device as a small electronic device according to a fifth embodiment of the invention.
Figure 6C:
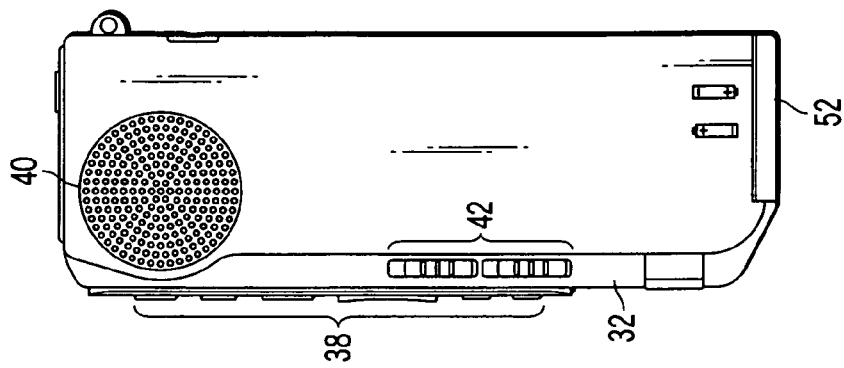
Figure 6B:
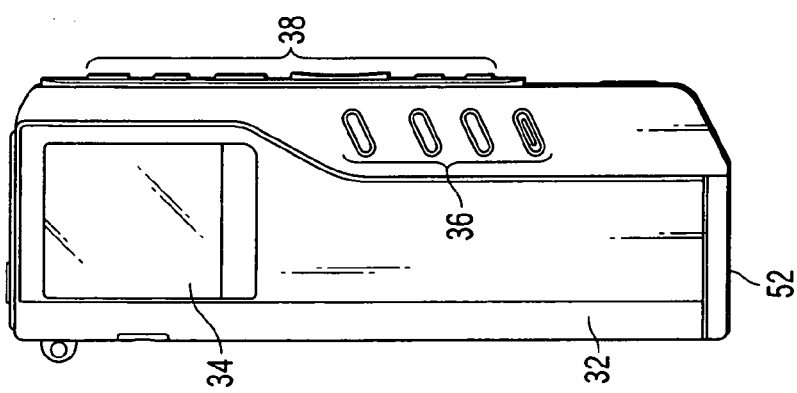
Figure 6A:
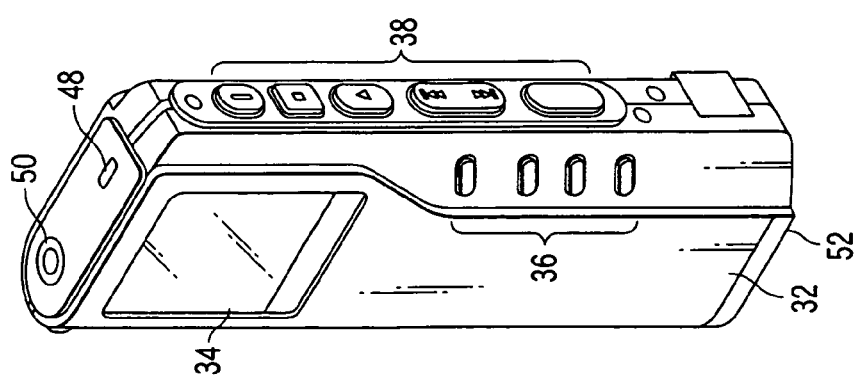

FIGS. 6A to 6D are external views showing the concrete structure of an audio recording-playback device as a small electronic device according to a fifth embodiment of the invention. FIG. 6A is a perspective showing the front side, FIG. 6B is a view showing the front side, FIG. 6C is a view showing the rear side, and FIG. 6D is a magnified view of a cell cover.

On the front side of a main body 32 of an audio recording-playback device, there is provided a liquid crystal screen 34 that consists of an LCD, for example, and displays various information. In the area down below the liquid crystal screen 34, menu buttons 36 for switching modes, etc. are provided. On the side of the main body 32, control buttons 38 used for recording and playback are provided. On the rear side of the main body 32, a built-in speaker 40 is provided.

At the top of the main body 32, a built-in microphone 48 and an earphone jack 50 are provided. At the bottom of the main body 32, a cell cover 52 to house dry cells (not shown) is provided. The cell cover 52 is provided openable in the main body 32 centering around an axis of rotation not shown. In this case, a dry cell housing 54 to house two dry cells (not shown) is provided under the dry cell cover 52.

Figure 7:
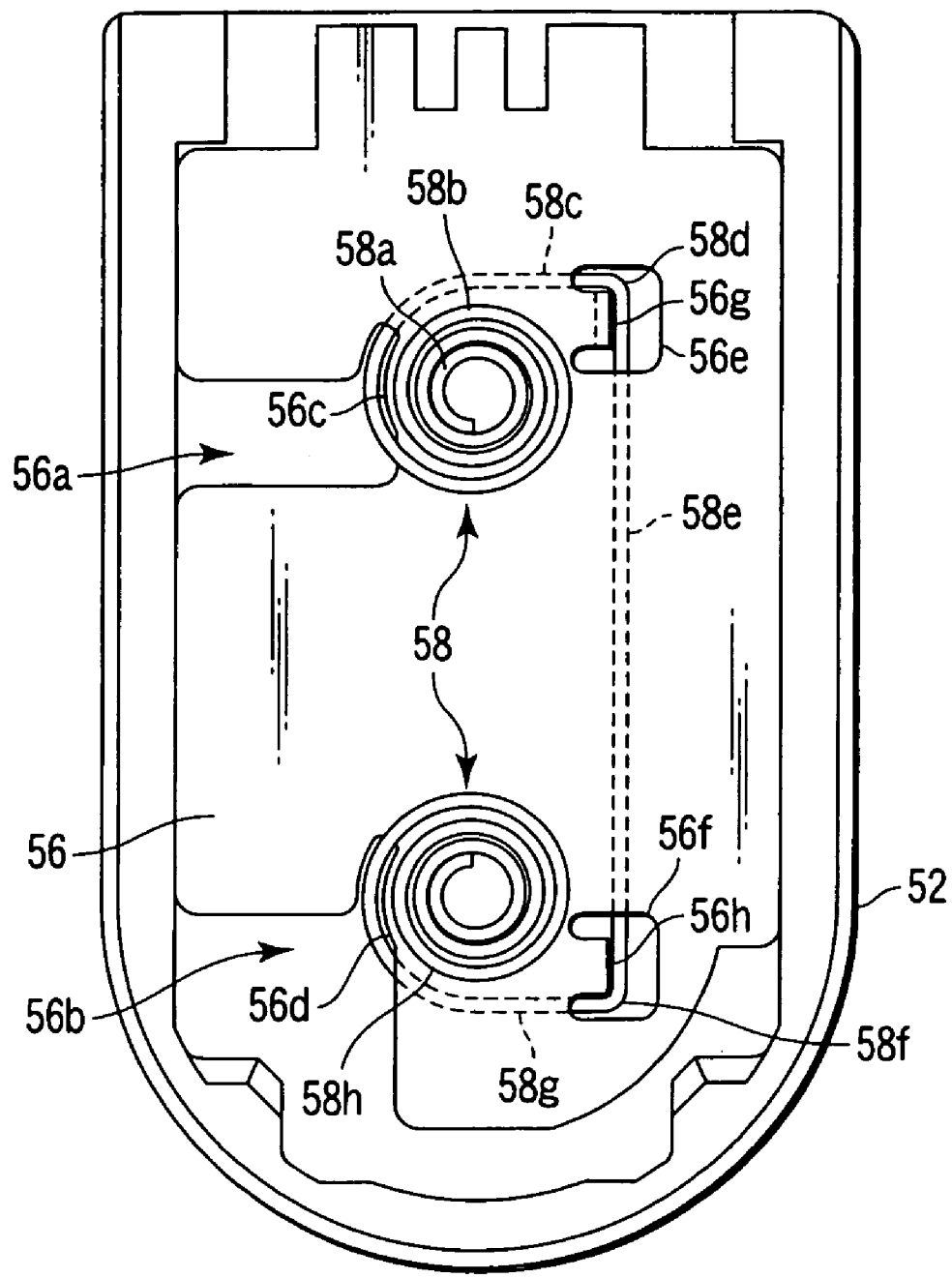
FIG. 7 is a view showing the internal structure of the cell cover 52 of FIGS. 6A to 6D.

FIG. 7 is a view showing the internal structure of the cell cover 52.

In FIG. 7, a metal plate 56 is provided as a plate member within the dry cell cover 52. The metal plate 56 is a plate member formed with notches 56a and 56b for fixing a compressed coil spring 58.

The compressed coil spring 58 is a spring member formed by deforming a linear elastic member. The coil spring constitutes a contact of a dry cell (not shown), and has a first spring 58b that is a spiral portion continued from a contact 58a, or one end of the spring. The bottom of the first spring 58b has a spring seat winding consisting of double-wound springs.

At the bottom of the first spring 58b, an extension 58c is formed extended linearly from the bottom. The extension 58c is further extended and formed continuously with a bent portion 58d that is bent substantially perpendicular to the other end of the compressed coil spring 58, a linear extended portion 58e, a bent portion 58f bent at almost right angle, and a second spring 58h that is a spiral portion continued to a contact 58i, or the other end, through a linear extended portion 58g. The bottom of the second spring 58h has a spring seat winding consisting of double-wound springs, like the first spring 58b.

These continuously formed extended portion 58c, bent portion 58d, extended portion 58e, bent portion 58f, and extended portion 58g constitute an engagement part for holding the metal plate 56 as a plate member together with the first and second springs 58b and 58h of the compressed coil spring 58. In this case, the engagement part is substantially U-shaped.

The metal plate 56 is held between the double-wound portions constituting the spring seat winding of the compressed coil spring 58, thereby movement of the compressed coil spring 58 in the vertical direction is controlled.

In the state that two spring seat windings of the compressed coil spring 58 are pressed to the end faces 56c and 56d, the metal plate 56 forms notches 56e and 56f near the bent portions 58d and 58f. In these notches 56e and 56f, raised bent portions 56g and 56h are formed as projections by being bent toward the dry cell cover 52, so as to engage with the bent portions 58d and 58f. These raised bent portions 56g and 56h serve as coming-off stoppers and left/right stoppers against the compressed coil spring 58 inserting direction.

When the compressed coil spring 58 is fixed to the metal plate 56, the engagement part of the compressed coil spring 58 needs to be deformed to ride over the raised bent portions 58a and 58b. The height of the raised bent portions 56g and 56h shall be set so that the deforming of the engagement part does not exceed the limit of the bending stress of the compressed coil spring 58.

Mounting and removal of the cell contact mechanism configured as describe above is the same as the spring mechanism in the fourth embodiment, and an explanation will be omitted.

In the first to fifth embodiments, the shape of the spring of a compressed coil spring is spiral. But, the spring may be shaped conical, cylindrical, drum-like or barrel-like, for example.

A compressed coil is used as a contact of a dry cell in the first to fifth embodiments, but the material is not limited to a compressed coil.

The present invention may be embodied in other specific forms than the first to fifth embodiments, without departing from the spirit of the invention.

Although the present invention has been described in terms of embodiments, it will be apparent that the invention may be applied to information devices other than digital cameras, and various modification are possible without departing the sprit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spring mechanism comprising:
    a plate member which has a first side and a second side opposite to the first side, the first side having at least one projection; and
    a spring member comprising a linear elastic member that has been deformed,
    wherein the spring member comprises: an engagement part which wraps at least partially around the projection to engage with the projection, a compressed coil spring which is mounted on the second side of the plate member and constitutes a cell contact, and an end turn in which the plate member is inserted such that the end turn contacts an end face of the plate member,
    wherein the spring member is held with respect to the plate member by the engagement part engaged with the projection of the plate member and the end turn contacting the end face of the plate member, such that movement of the spring member in at least one direction on the first side of the plate member is restricted.

2. The spring mechanism according to claim 1, wherein a bottom of the compressed coil spring contacts the second side of the plate member.

3. The spring mechanism according to claim 2, wherein the compressed coil spring is one of: conical, cylindrical, drum-like and barrel-like.

4. The spring mechanism according to claim 1, wherein a portion of the spring member at the first side of the plate member is provided substantially in a first plane, and the engagement part engages with the projection and the end turn abuts against the end face of the plate member to control horizontal movement of the spring member in the first plane.

5. The spring mechanism according to claim 4, wherein the projection has a height from the first side of the plate member such that deformation of the spring member does not exceed a limit of bending stress of the spring member when the spring member is deformed to be mounted to the plate member.

6. The spring mechanism according to claim 4, wherein the engagement part is one of substantially U-shaped and substantially V-shaped.

7. The spring mechanism according to claim 1, further comprising another compressed coil spring coupled to an end of the engagement part of the spring member.

8. The spring mechanism according to claim 1, wherein the spring member comprises a conductive member.

9. A spring mechanism comprising:
    a first member which has a first side and a second side opposite to the first side, and
    a second member,
    wherein the first member comprises a first engagement part that comprises a projection projecting from the first side of the first member to engage with the second member, and
    wherein the second member comprises a second engagement part that wraps at least partially around the projection to engage with the first engagement part of the first member, a spring-like contact to contact the first member at the second side of the first member, and an end turn in which the first member is inserted along a direction parallel to the first side such that the end turn contacts an end face of the first member.

10. The spring mechanism according to claim 9, wherein the spring-like contact comprises a compressed coil spring having a bottom that contacts the first member.

11. The spring mechanism according to claim 9, wherein the second member comprises a conductive member.

12. The spring mechanism according to claim 9, wherein the first engagement part comprises at least one additional projection provided on the first side of the first member, and the second engagement part is engageable with the additional projection.

13. The spring mechanism according to claim 9, wherein the first engagement part further comprises a hole into which the second engagement part is insertable.

14. The spring mechanism according to claim 9, wherein the first engagement part comprises at least one said projection and a hole provided on the first side of the first member, and the second engagement part is engageable with the first engagement part.

15. A spring mechanism comprising:
a first member which has a first side and a second side opposite to the first side, and
a second member,
wherein the first member comprises a first engagement part that comprises a projection projecting from the first member to engage with the second member to restrict movement of the second member in at least a first direction on the first side of the first member,
wherein the second member comprises a spring, a second engagement part that wraps at least partially around the projection part to engage with the first member, and an end turn in which the first member is inserted such that the end turn straddles the first side and the second side of the first member and contacts an end face of the first member, and
wherein movement of the second member in a second direction different from the first direction is restricted by the second engagement part and the end turn.

16. The spring mechanism according to claim 15, wherein the second engagement part engages with the first member at the first side of the first member, the spring contacts the first member at the first side of the first member, and the second member comprises a holder which contacts the first member at the second side of the first member.

17. The spring mechanism according to claim 1, wherein the end turn contacting the end face of the plate member restricts movement of the spring member in another direction.

* * * * *